United States Patent
So

(10) Patent No.: US 11,655,576 B2
(45) Date of Patent: May 23, 2023

(54) OPERATING MODE DETERMINING METHOD AND OPERATING MODE DETERMINING DEVICE

(71) Applicant: LG ELECTRONICS INC., Seoul (KR)

(72) Inventor: Suk Kyoung So, Seongnam-si (KR)

(73) Assignee: LG ELECTRONICS INC., Seoul (KR)

( * ) Notice: Subject to any disclaimer, the term of this patent is extended or adjusted under 35 U.S.C. 154(b) by 728 days.

(21) Appl. No.: 16/579,741

(22) Filed: Sep. 23, 2019

(65) Prior Publication Data

US 2020/0018006 A1    Jan. 16, 2020

(30) Foreign Application Priority Data

Aug. 22, 2019    (KR) .......................... 10-2019-0103063

(51) Int. Cl.
*D06F 33/32*        (2020.01)
*G06N 3/08*         (2023.01)
(Continued)

(52) U.S. Cl.
CPC .............. *D06F 33/32* (2020.02); *D06F 34/18* (2020.02); *G05B 13/0265* (2013.01); *G06F 18/21* (2023.01); *G06N 3/045* (2023.01); *G06N 3/08* (2013.01); *G06T 7/97* (2017.01); *G06V 10/803* (2022.01); *G06V 10/82* (2022.01); *G06V 30/19173* (2022.01); *G06V 30/413* (2022.01);
(Continued)

(58) Field of Classification Search
CPC .............. D06F 2103/00; D06F 2103/02; D06F 2103/06; D06F 2103/38; D06F 2105/00; D06F 2105/54; D06F 2105/58; D06F 2105/60; D06F 33/32; G06T 2210/16; G06T 19/006; G06T 2207/20; G06T 2207/30196
USPC .......................................................... 8/158
See application file for complete search history.

(56) References Cited

U.S. PATENT DOCUMENTS

2021/0303868 A1*    9/2021    Yeo ...................... G06F 16/583

FOREIGN PATENT DOCUMENTS

CN    109112770 A    *    1/2019    ............ D06F 33/00
CN    111832541 A    *    10/2020
(Continued)

*Primary Examiner* — Masum Billah
(74) *Attorney, Agent, or Firm* — Lee, Hong, Degerman, Kang & Waimey PC

(57) ABSTRACT

Disclosed are an operating mode determining method and an operating mode determining device for determining an operating mode of a clothing treatment apparatus using image information by executing an artificial intelligence (AI) algorithm and/or machine learning algorithm in a 5G environment connected for the Internet of Things. According to an embodiment of the present disclosure, the operating mode determining method includes obtaining first image information obtained by photographing clothing through a camera of the clothing treatment apparatus, obtaining second image information obtained by photographing an entrance and exit of a user wearing the clothing through a camera for monitoring an entrance and exit of a room, and determining an operating mode of the clothing treatment apparatus according to an analysis result of the first image information and the second image information.

13 Claims, 6 Drawing Sheets

(51) Int. Cl.
*G05B 13/02* (2006.01)
*G06T 7/00* (2017.01)
*D06F 34/18* (2020.01)
*G06V 30/413* (2022.01)
*G06F 18/21* (2023.01)
*G06N 3/045* (2023.01)
*H04N 23/90* (2023.01)
*G06V 30/19* (2022.01)
*G06V 10/80* (2022.01)
*G06V 10/82* (2022.01)
*D06F 103/00* (2020.01)
*D06F 103/02* (2020.01)
*D06F 103/06* (2020.01)
*D06F 103/38* (2020.01)
*D06F 105/00* (2020.01)
*D06F 105/54* (2020.01)
*D06F 105/58* (2020.01)
*D06F 105/60* (2020.01)
*D06F 33/36* (2020.01)

(52) U.S. Cl.
CPC ............. *H04N 23/90* (2023.01); *D06F 33/36* (2020.02); *D06F 2103/00* (2020.02); *D06F 2103/02* (2020.02); *D06F 2103/06* (2020.02); *D06F 2103/38* (2020.02); *D06F 2105/00* (2020.02); *D06F 2105/54* (2020.02); *D06F 2105/58* (2020.02); *D06F 2105/60* (2020.02); *G06T 2207/20084* (2013.01); *G06T 2207/30196* (2013.01)

(56) References Cited

FOREIGN PATENT DOCUMENTS

| | | | |
|---|---|---|---|
| KR | 100370363 | 1/2003 | |
| KR | 2009042135 A * | 4/2009 | ......... G06K 9/00006 |
| KR | 101954032 | 2/2019 | |

* cited by examiner

OPERATING MODE DETERMINING METHOD AND OPERATING MODE DETERMINING DEVICE

CROSS-REFERENCE TO RELATED APPLICATION

Pursuant to 35 U.S.C. § 119(a), this application claims the benefit of earlier filing date and right of priority to Korean Application No. 10-2019-0103063, filed on Aug. 22, 2019, the contents of which are all hereby incorporated by reference herein in its entirety.

BACKGROUND

1. Technical Field

The present disclosure relates to an operating mode determining method and an operating mode determining device, and more particularly, an operating mode determining method and an operating mode determining device for determining an operating mode of a clothing treatment apparatus using image information of clothing obtained through a clothing treatment apparatus and a home monitoring camera.

2. Description of Related Art

The clothing treatment apparatus may collectively refer to a device that applies water to the treatment chamber in which the clothing is housed to remove contaminants on the clothing, or dries the wet clothing by applying dry air, or blows the air or apply steam to refresh the clothing (e.g. removing wrinkles or odors).

In particular, Related Art 1 and Related Art 2 disclose a technique for processing clothing by storing the clothing in the clothing treatment apparatus.

Related Art 1 discloses a technology for a clothing cleaning management apparatus which provides steam, drying, and moving hangers to clothes stored inside so as to easily and effectively dry and sterilize the clothes and prevent wrinkles at the same time, but in order to operate the clothing cleaning management apparatus, Related Art 1 has a problem that a user directly sets an operating mode and enters an operation start button to operate the clothing treatment apparatus.

Related Art 2 discloses a technique for a multi-purpose clothes dryer that can be used as a wardrobe if necessary, in which when drying clothes, high temperature and humid hot air are applied to remove wrinkles while sterilizing and deodorizing effects are obtained simultaneously. However, in order to operate the clothes dryer, the user must manually set the operating mode and enter the operation start button so that there is an uncomfortable problem of operating the clothing treatment apparatus.

The above-described background is technical information that the inventor holds for deriving the present disclosure or is acquired in the derivation process of the present disclosure, and is not necessarily a known technology disclosed to the general public before the application of the present disclosure.

RELATED ART DOCUMENTS

Patent Documents

Related Art 1: Korean Patent No. 10-1954032 (registered on Feb. 25, 2019)

Related Art 2: Korean Patent No. 10-0370363 (registered on Jan. 16, 2003)

SUMMARY OF THE INVENTION

An aspect of the present disclosure is to solve the problem of the prior art that the user must manually set the operating mode and enter the operation start button to operate the clothing treatment apparatus.

Another aspect of the present disclosure is to automatically determine an operating mode of a clothing treatment apparatus based on clothing photographing image information obtained by photographing through the clothing treatment apparatus.

Another aspect of the present disclosure is to automatically determine the operating mode of the clothing treatment apparatus based on the clothing photographing image information obtained by photographing through the clothing treatment apparatus and the image information of the entrance and exit of the user wearing the clothing, which is photographed through the home monitoring camera.

Another aspect of the present disclosure is to automatically determine the operating mode of the clothing treatment apparatus based on the clothing photographing image information obtained by photographing through the clothing treatment apparatus, the image information of the entrance and exit of the user wearing the clothing, which is photographed through the home monitoring camera, and weather information of the entrance and exit time of the user.

Another aspect of the present disclosure is to improve the convenience of the user by automatically setting and operating the operating mode of the laundry apparatus and the clothes dryer interlinked through the clothing treatment apparatus and the network.

Another aspect of the present disclosure is to solve the problem of the prior art, which requires the user to manually set an operating mode and enter an operation start button in order to operate a clothing treatment apparatus, while using an optimal processor resource.

The present disclosure is not limited to what has been described above, and other aspects and advantages of the present disclosure will be understood by the following description and become apparent from the embodiments of the present disclosure. Furthermore, it will be understood that aspects and advantages of the present disclosure may be achieved by the means set forth in claims and combinations thereof.

According to an embodiment of the present disclosure, the operating mode determining method may include determining an operating mode of the clothing treatment apparatus using image information of the clothing acquired through the clothing treatment apparatus and the home monitoring camera.

Specifically, an operating mode determining method according to an embodiment of the present disclosure includes obtaining first image information obtained by photographing clothing through a camera of the clothing treatment apparatus, obtaining second image information obtained by photographing an entrance and exit of a user wearing the clothing through a camera for monitoring an entrance and exit of a room, and determining an operating mode of the clothing treatment apparatus according to an analysis result of the first image information and the second image information.

Through the operating mode determining method according to an embodiment of the present disclosure, by automatically setting and operating the operating mode of the clothing treatment apparatus based on the clothing photographing image information, the user's satisfaction with the clothing treatment apparatus can be improved.

In addition, the obtaining of the second image information may include obtaining the second image information including a going out time and a returning time of the user wearing the clothing.

In addition, the operating mode determining method according to an embodiment of the present disclosure may further include, after the obtaining of the second image information and before the determining of the operating mode, obtaining location information between the going out time and the returning time from the user's terminal.

In addition, the determining of the operating mode may include determining a clothing material type from the first image information, and extracting management guide information of the clothing based on a database in which a management guide according to the clothing material type is stored in advance, predicting a state of the clothing by extracting weather information between the going out time and the returning time included in the second image information, and determining an operating mode of the clothing treatment apparatus by combining the management guide information and the predicted state of the clothing.

In addition, the determining of the operating mode may include determining a clothing material from the first image information by using a first deep neural network that is pre-trained to determine a clothing material from a clothing image, extracting management guide information of the clothing based on a database in which a management guide according to a clothing material type is stored in advance, predicting a state of the clothing by extracting weather information between the going out time and the returning time included in the second image information, and determining an operating mode of a clothing treatment apparatus by combining the clothing material information, management guide information of the clothing, and a predicted state of the clothing.

In addition, the determining of the operating mode may include determining a clothing material type from the first image information and extracting management guide information according to the clothing material type; predicting a state of the clothing by extracting weather information of an area according to the location information between the going out time and the returning time included in the second image information, and determining an operating mode of the clothing treatment apparatus by combining the management guide information and the predicted state of the clothing.

In addition, in the operating mode determining method according to an embodiment of the present disclosure, the weather information may include one or more of temperature, humidity, and fine dust degree of an area according to the location information, and the predicting of the state of the clothing may include predicting a state of the clothing using a second deep neural network that is pre-trained to predict a state of clothing that changes according to an environmental condition including one or more of temperature, humidity, and fine dust degree and a time when clothing is exposed to a corresponding environment.

In addition, the operating mode determining method according to an embodiment of the present disclosure may further include interworking with the clothing treatment apparatus and setting a washing mode of a laundry apparatus to wash the clothing in response to an analysis result of the first image information and the second image information.

An operating mode determining device according to an embodiment of the present disclosure includes a first acquisition unit configured to obtain first image information obtained by photographing clothing through a camera of the clothing treatment apparatus, a second acquisition unit configured to obtain second image information obtained by photographing an entrance and exit of a user wearing the clothing through a camera for monitoring an entrance and exit of a room, and a determination unit configured to determine an operating mode of the clothing treatment apparatus according to an analysis result of the first image information and the second image information.

Through the operating mode determining device according to an embodiment of the present disclosure, by automatically setting and operating the operating mode of the clothing treatment apparatus based on the clothing photographing image information, the user's satisfaction with the clothing treatment apparatus can be improved.

In addition, the second acquisition unit may be configured to obtain the second image information including a going out time and a returning time of the user wearing the clothing.

In addition, the operating mode determining device according to an embodiment of the present disclosure may further include, a third acquisition unit configured to obtain location information between the going out time and the returning time from the user's terminal after the obtaining of the second image information and before the determining of the operating mode.

In addition, the determination unit may include an extraction unit configured to determine a clothing material type from the first image information, and extract management guide information of the clothing based on a database in which a management guide according to the clothing material type is stored in advance, a prediction unit configured to predict a state of the clothing by extracting weather information between the going out time and the returning time included in the second image information, and a mode determining unit configured to determine an operating mode of the clothing treatment apparatus by combining the management guide information and the predicted state of the clothing.

In addition, the determination unit may include a judgement unit configured to determine a clothing material from the first image information by using a first deep neural network that is pre-trained to determine a clothing material from a clothing image, an extraction unit configured to extract management guide information of the clothing based on a database in which a management guide according to a clothing material type is stored in advance, a prediction unit configured to predict a state of the clothing by extracting weather information between the going out time and the returning time included in the second image information, and a mode determining unit configured to determine an operating mode of a clothing treatment apparatus by combining the clothing material information, management guide information of the clothing, and a predicted state of the clothing.

In addition, the determination unit may include an extraction unit configured to determine a clothing material type from the first image information and extract management guide information according to the clothing material type, a prediction unit configured to predict a state of the clothing by extracting weather information of an area according to the location information between the going out time and the returning time included in the second image information, and a mode determining unit configured to determine an operating mode of the clothing treatment apparatus by combining the management guide information and the predicted state of the clothing.

In addition, the weather information may include one or more of temperature, humidity, and fine dust degree of an area according to the location information, and the prediction unit may be configured to predict a state of the clothing using a second deep neural network that is pre-trained to predict a state of clothing that changes according to an environmental condition including one or more of temperature, humidity, and fine dust degree and a time when clothing is exposed to a corresponding environment.

In addition, the operating mode determining device according to an embodiment of the present disclosure may further include a setting unit configured to interwork with the clothing treatment apparatus and set a washing mode of a laundry apparatus to wash the clothing in response to an analysis result of the first image information and the second image information.

In addition, other methods and other systems for implementing the present disclosure, and a computer-readable medium for storing a computer program for executing the above method may be further provided.

Other aspects, features, and advantages other than those described above will become apparent from the following drawings, claims, and detailed description of the present disclosure.

DETAILED DESCRIPTION

Figure 1:
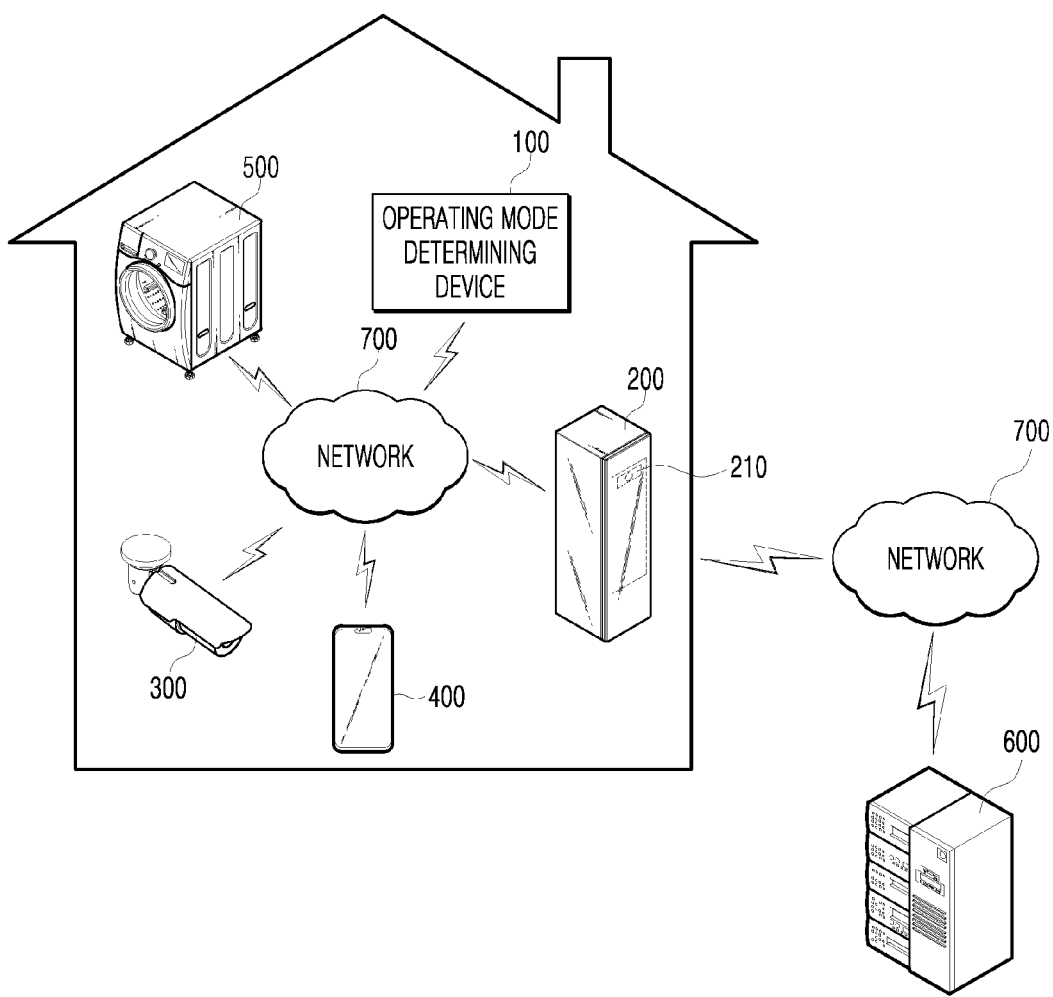
FIG. 1 is an exemplary diagram of an operating mode determining environment including an operating mode determining device, a clothing treatment apparatus, a user terminal, a laundry apparatus, a server, and a network connecting them to each other, according to an embodiment of the present disclosure.

Advantages and features of the present disclosure and methods for achieving them will become apparent from the descriptions of aspects hereinbelow with reference to the accompanying drawings. However, the description of particular example embodiments is not intended to limit the present disclosure to the particular example embodiments disclosed herein, but on the contrary, it should be understood that the present disclosure is to cover all modifications, equivalents and alternatives falling within the spirit and scope of the present disclosure. The example embodiments disclosed below are provided so that the present disclosure will be thorough and complete, and also to provide a more complete understanding of the scope of the present disclosure to those of ordinary skill in the art. In the interest of clarity, not all details of the relevant art are described in detail in the present specification in so much as such details are not necessary to obtain a complete understanding of the present disclosure.

The terminology used herein is used for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "includes," "including," "containing," "has," "having" or other variations thereof are inclusive and therefore specify the presence of stated features, integers, steps, operations, elements, and/or components, but do not preclude the presence or addition of one or more other features, integers, steps, operations, elements, components, and/or groups thereof. Furthermore, these terms such as "first," "second," and other numerical terms, are used only to distinguish one element from another element. These terms are generally only used to distinguish one element from another.

Hereinafter, embodiments of the present disclosure will be described in detail with reference to the accompanying drawings. Like reference numerals designate like elements throughout the specification, and overlapping descriptions of the elements will not be provided.

FIG. 1 is an exemplary diagram of an operating mode determining environment including an operating mode determining device, a clothing treatment apparatus, a user terminal, a laundry apparatus, a server, and a network connecting them to each other, according to an embodiment of the present disclosure. Referring to FIG. 1, the operating mode determining environment includes an operating mode determining device 100, a clothing treatment apparatus 200, a home monitoring camera 300, a user terminal 400, a laundry apparatus 500, a server 600, and network 700.

The operating mode determining device 100 may obtain first image information of photographing clothing through the camera 210 of the clothing treatment apparatus 200 and second image information of the entrance and exit of the user wearing the clothing, which is photographed through the home monitoring camera 300, and may determine an operating mode of the clothing treatment apparatus 200 according to the analysis result of the first image information and the second image information.

Here, the camera 210 of the clothing treatment apparatus 200 photographing the first image information may be provided outside the clothing treatment apparatus 200 as shown in FIG. 1 or may be provided inside the clothing treatment apparatus 200 as an alternative embodiment. Here, the door of the clothing treatment apparatus 200 may be composed of a mirror. The first image information may be generated by photographing a user's worn clothing that is stayed in front of a door of the clothing treatment apparatus 200 for a predetermined time (e.g., 3 seconds) or more or may be generated by photographing the clothing that is displayed inside the clothing treatment apparatus 200. In addition, staying in front of the door of the clothing treatment apparatus 200 for a predetermined time or more includes a situation in which the user checks the state of wearing the clothing and may mean that the user can go out while wearing the corresponding clothing.

In addition, the second image information obtained by photographing through the home monitoring camera 300 may include an image of a user who wears clothing, and a time of going out and returning home of the user who wears the clothing. Here, the going out time of the user who wears the clothing may include a time when the user disappears from the room by tracking the user who stays at the front of the door of the clothing treatment apparatus 200 for a predetermined time, and the returning time of the user who wears the clothing may include a time when the user appears in the room by the photograph of the home monitoring camera 300 after the going out time.

As an alternative embodiment, the operating mode determining device 100 may obtain location information between a going out time and a returning time, that is, global positioning system (GPS) information, from the user terminal 400. The user terminal 400 may be provided with a GPS module (or a receiver, not illustrated) therein in order to generate the GPS information. The GPS module may receive radio signals from a plurality of orbiting GPS satellites (not illustrated), and by using the time of arrival of a radio signal from a GPS satellite to the user terminal 400, may calculate location information (longitude and latitude coordinates) of the user terminal 400, and calculate time information of when the location information is calculated. Here, the longitude and latitude coordinates refer to the combination of a longitude value and a latitude value of a point on the globe when the globe is horizontally divided from 360° into 180° eastern longitude and 180° western longitude, and vertically divided from 180° into 90° northern latitude and 90° southern latitude.

The operating mode determining device 100 may determine the type of material of clothing from the first image information, and extract management guide information of the clothing based on a database (140 of FIG. 3) in which the management guide according to the material type of the clothing is stored in advance. Here, the management guide information of clothing may include an analysis result of the clothing material and the washing symbol included in the care label included in the first image information. In addition, the database 140 stores the management guide of clothing according to the clothing material and the management guide of clothing according to the washing symbol in advance. If the care label is exposed facing the camera attached inside while a user displays clothing in the clothing treatment apparatus 200, the material and the washing symbol may be extracted from the care label included in the first image information obtained by photographing through the camera through text recognition or image recognition, and the management guide information of the clothing may be extracted by comparing it with the database 140.

The operating mode determining device 100 may predict the state of the clothing by extracting weather information between the going out time and the returning time included in the second image information. Herein, the state of clothing may include a contamination degree of the clothing. The operating mode determining device 100 may receive a weather information between a going out time and a returning time by requesting a weather information providing apparatus (not shown) that provides weather information through the network 700. The operating mode determining device 100 may determine the operating mode of the clothing treatment apparatus by combining the management guide information of the clothing and the predicted state of the clothing.

As an alternative embodiment, the operating mode determining device 100 may determine the clothing material from the first image information by using a first deep neural network that is pre-trained to determine the clothing material from the clothing image. The operating mode determining device 100 may extract management guide information of clothing based on a database (140 of FIG. 3) in which a management guide according to the type of clothing material is stored in advance. The operating mode determining device 100 may predict the state of the clothing by extracting weather information between the going out time and the returning time included in the second image information. The operating mode determining device 100 may determine the operating mode of the clothing treatment apparatus by combining the clothing material information, the management guide information of the clothing, and the predicted state of the clothing.

As an alternative embodiment, the operating mode determining device 100 may determine the type of clothing material from the care label included in the first image information and/or the first image information, extract management guide information according to clothing material type, predict the state of clothing by extracting weather information of a region according to location information between the going out time and the returning time included in the second image information, and determine the operating mode of the clothing treatment apparatus by combining the management guide information of the clothing and the predicted state of the clothing.

As an alternative embodiment, the operating mode determining device 100 may be linked with the clothing treatment apparatus 200 through the network 700 in response to an analysis result of the first image information and the second image information, and may set a laundry mode of the laundry apparatus 500 for washing clothing.

The clothing treatment apparatus 200 may collectively refer to a device that applies water to the treatment chamber in which the clothing is housed to remove contaminants on the clothing, or dries the wet clothing by applying dry air, or blows the air or apply steam to refresh the clothing (e.g. removing wrinkles or odors).

The home monitoring camera 300 is provided in a main room where monitoring is required in a home, and transmits photographed images to a receiving device (for example, a personal computer, an operating mode determining device 100, a user terminal 400, etc.), so that remote monitoring can be done at close range. The home monitoring camera 300 may refer to a camera for photographing a subject in a photographing area using, for example, a complementary metal-oxide semiconductor (COMS) module (not shown) or a charge coupled device (CCD) module. An input image frame may be provided to a COMS module or a CCD module via a lens (not shown), and the COMS module or the CCD module can convert an optical signal of a subject that has passed through the lens into an electrical signal, and output the electrical signal. In addition, the home monitoring camera 300 may be a PTZ camera having a pan/tilt/zoom function. An image signal processing unit (not shown) is provided inside the home monitoring camera 300, and the image signal processing unit may reduce noise for a photographed image frame and may perform image signal processing for image quality improvement, such as gamma correction, color filter array interpolation, color matrix, color correction, and color enhancement. Further, the image signal processing unit may perform functions such as a coloring process, a blurring process, an edge emphasizing process, an image analysis process, an image recognition process, and an image effect process. Facial recognition, scene recognition, and the like may be performed for the image recognition. Image synthesis processing, for example, brightness level adjustment, color correction, contrast adjustment, contour enhancement adjustment, screen division processing, character image generation, may be performed, etc.

The user terminal 400 may be provided with a service for driving or controlling the operating mode determining device 100 through an authentication process after accessing the operating mode determining device driving application or the operating mode determining device driving site. In the present embodiment, the user terminal 400 that completes the authentication process may drive the operating mode determining device 100 and control the operation of the operating mode determining device 100.

In addition, the user terminal 400 may receive an output result from the operating mode determining device 100, and may transmit user feedback information on the output result to the operating mode determining device 100. Here, the output result may include an operating mode of the clothing treatment apparatus 200, an operating mode of the laundry apparatus 500, a clothing material, a management guide of the clothing, a going out time and a returning time of the user wearing the clothing, and location information between a going out time and a returning time of the user, and weather information between a going out time and a returning time of the user.

In the present embodiment, the output result described above may be transmitted and outputted through one or more of the clothing treatment apparatus 200 and the laundry apparatus 500 as well as the user terminal 400.

In the present embodiment, the user terminal 400 may be a desktop computer, smartphone, notebook, tablet PC, smart TV, cell phone, personal digital assistant (PDA), laptop, media player, micro server, global positioning system (GPS) device, electronic book terminal, digital broadcast terminal, navigation device, kiosk, MP3 player, digital camera, home appliance, and other mobile or immobile computing devices operated by the user, but is not limited thereto. Furthermore, the user terminal 400 may be a wearable terminal having a communication function and a data processing function, such as a watch, glasses, a hair band, a ring, or the like. The user terminal 400 is not limited to the above-mentioned devices, and thus any terminal that supports web browsing may be used as the user terminal 400.

The laundry apparatus 500 may be a household appliance for washing clothing, and may include an apparatus that may perform washing and drying of clothing. The washing of clothing may include a cycle for removing contaminants from the laundry through the action of water and detergent, and the drying of the clothing may include, for example, a cycle for removing moisture contained in the clothing through a hot air supply.

The server 600 may be a database server that provides big data required for applying various artificial intelligence algorithms, and data used for operating the operation mode determining device 100. In addition, the server 600 may include a web server or an application server to remotely control the operation of the operating mode determining device 100 using an operating mode determining device driving application or an operating mode determining device driving web browser installed in the user terminal 400.

Artificial intelligence (AI), which is an area of computer engineering and information technology for studying methods for enabling computers to mimic thinking, learning, self-development, or the like that may be carried out with human intelligence, may represent enabling computers to mimic human intelligent behavior.

In addition, artificial intelligence does not exist on its own, but is rather directly or indirectly related to a number of other fields in computer science. In recent years, there have been numerous attempts to introduce an element of AI into various fields of information technology to solve problems in the respective fields.

Machine learning is an area of artificial intelligence that includes the field of study that gives computers the capability to learn without being explicitly programmed Specifically, the Machine Learning can be a technology for researching and constructing a system for learning, predicting, and improving its own performance based on empirical data and an algorithm for the same. Machine learning algorithms, rather than only executing rigidly-set static program commands, may be used to take an approach that builds models for deriving predictions and decisions from inputted data.

The server 600 determines the operating mode of the clothing treatment apparatus 200 and/or the laundry apparatus 500 by collecting and analyzing the first image information and the second image information from the operating mode determining device 100, thereby transmitting the operating mode to the operating mode determining device 100. The server 600 may determine the clothing material from the first image information by using a first deep neural network that is pre-trained to determine the clothing material from the clothing image, and transmit the clothing material determination result to the operating mode determining device 100. Furthermore, the server 600 may predict the state of clothing by using a second deep neural network that is pre-trained to predict the condition of clothing that changes according to time when clothing is exposed to the corresponding environment and environmental conditions including one or more of temperature, humidity, fine dust, and snow/rain amount, and transmit the state prediction result of clothing to the operating mode determining device 100.

In this embodiment, depending on the processing capability of the operating mode determining device 100, at least some of the operating mode determination of the clothing treatment apparatus 200 and/or the laundry apparatus 500 performed by the server 600 and/or the learning and re-learning of the first deep neural network and the second deep neural network may be performed by the operating mode determining device 100.

The network 700 may serve to connect the operating mode determining device 100, the clothing treatment apparatus 200, the home monitoring camera 300, the user terminal 400, the laundry apparatus 500, and the server 600. The network 700 may include, for example, wired networks such as local area networks (LANs), wide area networks (WANs), metropolitan area networks (MANs), and integrated service digital networks (ISDNs), or wireless networks such as wireless LANs, CDMA, Bluetooth, and satellite communication, but the scope of the present disclosure is not limited thereto. Furthermore, the network 700 may transmit and receive information using short-range communications or long-distance communications. Here, the short-range communications may include Bluetooth, radio frequency identification (RFID), infrared data association (IrDA), ultra-wideband (UWB), ZigBee, and wireless fidelity (Wi-Fi) technology. The long-distance communications may include code division multiple access (CDMA), frequency division multiple access (FDMA), time division multiple access (TDMA), orthogonal frequency division multiple access (OFDMA), and single carrier frequency division multiple access (SC-FDMA) technology.

The network 700 may include a connection of network elements such as hubs, bridges, routers, switches, and gateways. The network 700 may include one or more connected networks, including a public network such as the Internet and a private network such as a secure corporate private network. For example, the network may include a multi-network environment. Access to the network 700 may be provided via one or more wired or wireless access networks. Furthermore, the network 700 may support the Internet of Things (IoT) for 5G communication or exchanging and processing information between distributed elements such as objects.

Figure 2:
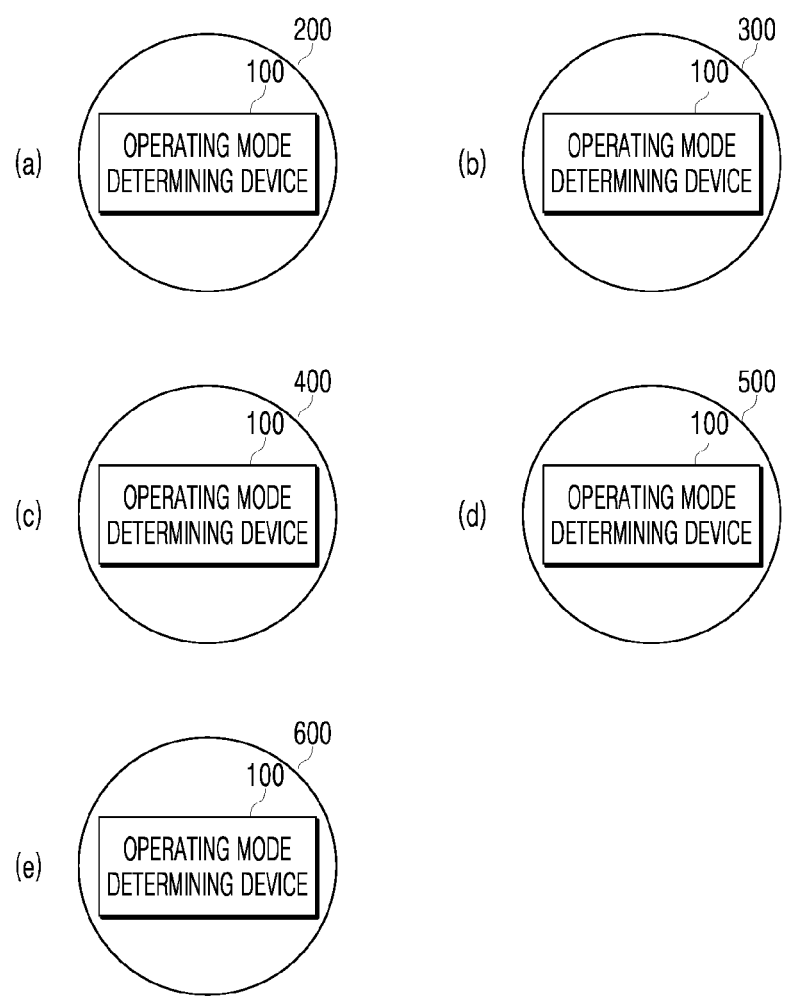
FIG. 2 is an exemplary diagram of a personal operating mode determining environment illustrating an implementation example of an operating mode determining device according to another embodiment of the present disclosure.

FIG. 2 is an exemplary diagram of a personal operating mode determining environment illustrating an implementation example of an operating mode determining device according to another embodiment of the present disclosure. Hereinbelow, the common parts previously described with reference to FIG. 1 will not be described, so as to avoid repetitive description.

Referring to FIGS. 2A to 2E, the operating mode determining device 100 may be included in one of the clothing treatment apparatus 200, the home monitoring camera 300, the user terminal 400, the laundry apparatus 500, and the server 600. There are various methods for including the operating mode determining device 100 in one of the clothing treatment apparatus 200, the home monitoring camera 300, the user terminal 400, the laundry apparatus 500, and the server 600. In a specific embodiment, the operating mode determining device 100 may be installed in one of the clothing treatment apparatus 200, the home monitoring camera 300, the user terminal 400, the laundry apparatus 500, and the server 600 through the network 700. For example, the operating mode determining device 100 may be installed in one of the clothing treatment apparatus 200, the home monitoring camera 300, the user terminal 400, the laundry apparatus 500, and the server 600 in one application form. In another specific embodiment, the operating mode determining device 100 may be installed in one of the clothing treatment apparatus 200, the home monitoring camera 300, the user terminal 400, the laundry apparatus 500, and the server 600 through offline. However, this is an exemplary form and the present disclosure is not limited thereto. The operating mode determining device 100 may be installed in various forms in one of the clothing treatment apparatus 200, the home monitoring camera 300, the user terminal 400, the laundry apparatus 500, and the server 600.

Figure 3:
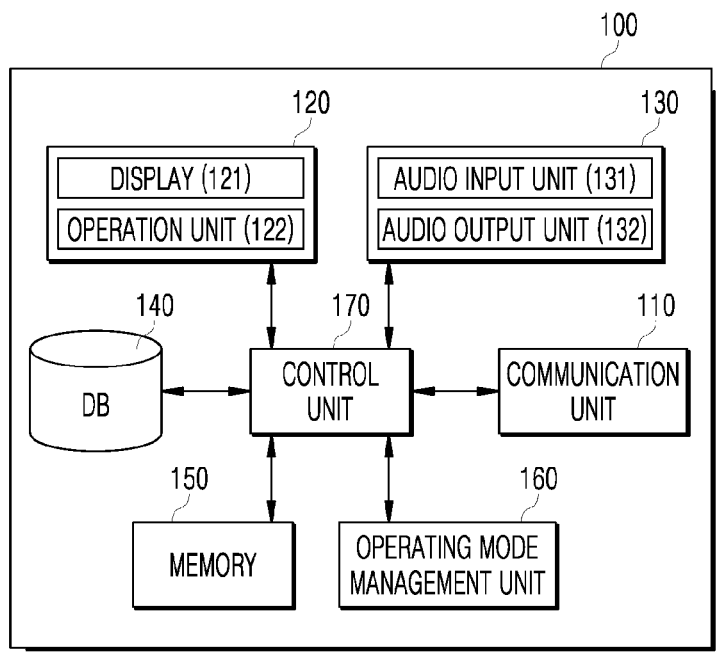
FIG. 3 is a diagram schematically illustrating a detailed configuration of an operating mode determining device according to an embodiment of the present disclosure.

FIG. 3 is a diagram schematically illustrating a detailed configuration of an operating mode determining device according to an embodiment of the present disclosure. In the following description, the description of parts that are the same as those in FIG. 1 and FIG. 2 will be omitted.

Referring to FIG. 3, the operating mode determining device 100 may include a user interface 120 including a communication unit 110, a display 121, and an operation unit 122. An audio processing unit 130 including an audio input unit 131 and an audio output unit 132, a database 140, a memory 150, an operating mode management unit 160, and a control unit 170.

The communication unit 110 may include a communication interface necessary for providing, in a packet data form, transmission/reception signals between the operating mode determining device 100, the clothing treatment apparatus 200, the home monitoring camera 300, the user terminal 400, the laundry apparatus 500 and/or the server 600 in linkage with the network 700. Furthermore, the communication unit 110 may serve to receive a predetermined information request signal from the clothing treatment apparatus 200, the user terminal 400, and/or the laundry apparatus 500, and may serve to transmit information processed by the operating mode determining device 100 to the clothing treatment apparatus 200, the user terminal 400, and/or the laundry apparatus 500. Also, the communication unit 110 may transmit a predetermined information request signal from the clothing treatment apparatus 200, the home monitoring camera 300, the user terminal 400, and/or the laundry apparatus 500 to the server 600, receive the response signal processed by the server 600, and transmit the received response signal to the clothing treatment apparatus 200, the user terminal 400, and/or the laundry apparatus 500. Furthermore, the communication unit 110 may be a device including hardware and software required for transmitting and receiving signals such as a control signal and a data signals via a wired or wireless connection to another network device.

Furthermore, the communication unit 110 may support a variety of object-to-object intelligent communication, Internet of things (IoT), Internet of everything (IoE), and Internet of small things (IoST), and may support, for example, machine to machine (M2M) communication, vehicle to everything (V2X) communication, and device to device (D2D) communication, and the like.

The display unit 121 in the user interface unit 120 may display a driving state of the operation mode determining device 100 under control of the controller 170. According to an embodiment, the display unit 121 may form a layered structure with a touch pad so as to be configured as a touch screen. In this case, the display unit 121 may also be used as the operation unit 122 capable of inputting information in response to a touch of a user. To this end, the display unit 121 may be configured with a touch-sensitive display controller or other various input and output controllers. As an example, the touch recognition display controller may provide an output interface and an input interface between the device and the user. The touch-sensitive display controller may transmit and receive electric signals to and from the control unit 170. Also, the touch recognition display controller may display a visual output to the user, and the visual output may include text, graphics, images, video, and a combination thereof. The display unit 121 may be a predetermined display member such as, for example, a touch-sensitive organic light emitting display (OLED), liquid crystal display (LCD), or light emitting display (LED).

The operation unit 122 of the user interface unit 120 may have a plurality of operation buttons (not shown) to transmit signals corresponding to the input buttons to the control unit 170. This operation unit 122 may be configured with a sensor, button, or switch structure capable of recognizing a touch or pressing operation of the user. In the present example, the operation unit 122 may transmit to the controller 170 an operation signal operated by the user in order to confirm or modify various information regarding the operation of the operation mode determining device 100 displayed on the display unit 121.

In the present embodiment, when the operating mode determining device 100 is included in the clothing treatment apparatus 200, the user terminal 400, and/or the laundry apparatus 500, the user interface 120 may be replaced with a display unit (not shown) and an operation unit (not shown) of the clothing treatment apparatus 200, the user terminal 400, and/or the laundry apparatus 500.

The audio input unit 131 of the audio processing unit 130 may receive utterance information from the user and transmit the utterance information to the control unit 170, and the control unit 170 may transmit the utterance information of the user to the operating mode management unit 160 to perform the speech recognition process. To this end, the audio input unit 131 may be provided with one or more microphone (not shown). Furthermore, the audio input unit 131 may be provided with a plurality of microphones (not shown) to more accurately receive the utterance information of the user. Here, each of the plurality of microphones may be spaced apart from each other at different positions, and may process the received utterance information of the user as an electrical signal.

As an alternative embodiment, the audio input unit 131 may use various noise removing algorithms for removing the noise generated during the process of receiving the utterance information of the user. In some embodiment, the audio input unit 131 includes various components for processing utterance information signals such as a filter (not shown) for removing noise when receiving utterance information of the user and an amplifier (not shown) for amplifying and outputting a signal outputted from the filter.

The audio output unit 132 of the audio processing unit 130 may output as an audio, notification messages such as beep, operating mode, operation status, error status, and the like, and the processing result corresponding to the speech command included in the utterance information of the user according to the control of the control unit 170. In the present embodiment, the audio output unit 132 may output a result of determining the operating mode of the clothing treatment apparatus 200 and/or the laundry apparatus 500 generated by the operating mode management unit 160. The audio output unit 132 may convert electric signals from the controller 170 into audio signals, and output the same. To this end, the audio output unit 132 may be provided with, for example, a speaker.

In the present embodiment, when the operating mode determining device 100 is included in the clothing treatment apparatus 200, the user terminal 400, and/or the laundry apparatus 500, the audio processing unit 130 may be replaced with an audio input unit (not shown) and an audio output unit (not shown) of the clothing treatment apparatus 200, the user terminal 400, and/or the laundry apparatus 500.

The database 140 may include a management database that stores information collected and generated by the operating mode determining device 100. Here, the management database may store first image information obtained from the clothing treatment apparatus 200, second image information obtained from the home monitoring camera 300, location information between the going out time and the returning time obtained from the user terminal 400, weather information between the going out time and returning time obtained from the weather information providing device, management guide information according to the type of clothing material, management guide information according to the washing symbol indicated on the care label of the clothing, state prediction result information of clothing, operating mode determination information of the clothing treatment apparatus 200, and the laundry mode setting information of the laundry apparatus 500.

The database 140 may further include a user database for storing user information. Here, the user database may store user information for receiving an operating mode determination of the clothing treatment apparatus 200 and/or the laundry apparatus 500. Here, the user information may include: basic information on a user, such as name, affiliation, personal data, gender, age, contact information, email, and address; authentication (login) information such as an ID (or email) and a password; and access-related information such as an access country, an access location, information about a device used for access, and an accessed network environment.

The memory 150 stores various information required for the operation of the operating mode determining device 100, for example, a first deep neural network model for determining the clothing material from the image information of the clothing and a second deep neural network model for predicting the state of clothing according to any environmental condition and the time when clothing is exposed to the corresponding environment, and may include a volatile or nonvolatile recording medium. Furthermore, the memory 150 may store control software for operating the operation mode determining device 100. Furthermore, the memory 150 may store a preset start word for determining whether a start word is present from the voice of the user. Meanwhile, the start word may be set by the manufacturer. For example, "Hi, Styler" may be set as the start word, and may be set and changed by the user. This start word is inputted to activate the speech recognition function of the operating mode determining device 100, and the operating mode determining device 100 that recognizes the start word uttered by the user may switch to the speech recognition function activation state.

Here, the memory 150 may include magnetic storage media or flash storage media, but the scope of the present disclosure is not limited thereto. This memory 150 may include an internal memory and/or an external memory, and may include: a volatile memory such as a DRAM, SRAM, or SDRAM; a non-volatile memory such as a one time programmable ROM (OTPROM), PROM, EPROM, EEPROM, mask ROM, flash ROM, NAND flash memory, or NOR flash memory; and a storage device such as an HDD or a flash drive such as an SSD, compact flash (CF) card, SD card, micro-SD card, mini-SD card, Xd card, or a memory stick.

Here, the operation mode determining device 100 may perform relatively simple speech recognition while the server 600 performs relatively more advanced speech recognition such as natural language processing. For example, if the user's speech contains a preset start word, the operating mode determining device 100 may activate a speech recognition function and switch to a state for receiving a speech command (operating mode request utterance speech for the clothing treatment apparatus 200) from a user. In this case, the operating mode determining device 100 may perform only a speech recognition process up to whether or not a start word speech is inputted, and a speech recognition for a subsequent user command may be performed through the server 600. Given that the system resources of the operation mode determining device 100 are limited, complex natural language recognition and processing may be performed through the server 600.

The operating mode management unit 160 may obtain first image information of photographing clothing through the camera 210 of the clothing treatment apparatus 200 and second image information of photographing the entrance and exit of the user wearing the clothing through the home monitoring camera 300, which is photographed through the home monitoring camera 300, and may determine an operating mode of the clothing treatment apparatus 200 according to the analysis result of the first image information and the second image information.

In addition, the operating mode management unit 160 may determine the type of clothing material from the first image information, extract management guide information of clothing based on a database (140 of FIG. 3) in which a management guide according to a clothing material type is stored in advance, extract weather information between the going out time and the returning time included in the second image information to predict the state of clothing, and determine the operating mode of the clothing treatment apparatus by combining the management guide information of the clothing and the predicted state of the clothing.

In addition, the operating mode management unit 160 may determine the clothing material from the first image information by using a first deep neural network that is previously trained to determine the clothing material from the clothing image, extract management guide information of clothing based on the database (140 of FIG. 3) in which a management guide according to a clothing material type is stored in advance, extract weather information between the going out time and the returning time included in the second image information to predict the state of clothing, and determine the operating mode of the clothing treatment apparatus by combining the clothing material information, the management guide information of the clothing, and the predicted state of the clothing.

Furthermore, the operating mode management unit 160 may determine the type of clothing material from the first image information, extract management guide information according to the type of clothing material, extract weather information of the area according to the location information between the going out time and the returning time included in the second image information to predict the state of clothing, and determine the operating mode of the clothing treatment apparatus by combining the management guide information of the clothing and the predicted state of the clothing.

Moreover, the operating mode management 160 may be linked with the clothing treatment apparatus 200 through the network 700 in response to an analysis result of the first image information and the second image information, and may set a laundry mode of the laundry apparatus 500 for washing clothing.

In the present embodiment, the operating mode management unit 160 may perform learning in linkage with the control unit 170 or may receive a learning result from the control unit 170. In the present embodiment, the operating mode management unit 160 may be provided outside the control unit 170 as shown in FIG. 3, and may be provided inside the control unit 170 and operate as the control unit 170, and may be provided inside the server 600 of FIG. 1. Hereinafter, details of the operating mode management unit 160 will be described with reference to FIG. 4.

The control unit 170 may control the entire operation of the operating mode determining device 100 by driving control software installed in the memory 150 as a kind of central processing device. The control unit 170 may include any type of device capable of processing data, such as a processor. Here, 'the processor' may, for example, refer to a data processing device embedded in hardware, which has physically structured circuitry to perform a function represented by codes or instructions contained in a program. As one example of the data processing device embedded in the hardware, a microprocessor, a central processing unit (CPU), a processor core, a multiprocessor, an application-specific integrated circuit (ASIC), a field programmable gate array (FPGA), and the like may be included, but the scope of the present disclosure is not limited thereto.

In the present embodiment, the control unit 170 may perform machine learning such as deep learning on the collected image information, weather information, and location information such that the operating mode determining device 100 determines the operating mode of the optimal clothing treatment apparatus 200 and/or laundry apparatus 500. The memory 150 may store data used for machine learning, result data, and the like.

Deep learning, which is a subfield of machine learning, enables data-based learning through multiple layers. As the number of layers in deep learning increases, the deep learning network may acquire a collection of machine learning algorithms that extract core data from multiple datasets.

Deep learning structures may include an artificial neural network (ANN), and may include a convolutional neural network (CNN), a recurrent neural network (RNN), a deep belief network (DBN), and the like. The deep learning structure according to the present embodiment may use various structures well known in the art. For example, the deep learning structure according to the present disclosure may include a CNN, an RNN, a DBN, and the like. RNN is an artificial neural network structure which is formed by building up layers at each instance, and which is heavily used in natural language processing and the like and effective for processing time-series data which vary over a course of time. A DBN includes a deep learning structure formed by stacking up multiple layers of a deep learning scheme, restricted Boltzmann machines (RBM). A DBN has the number of layers formed by repeating RBM training. A CNN includes a model mimicking a human brain function, built under the assumption that when a person recognizes an object, the brain extracts the most basic features of the object and recognizes the object based on the results of complex processing in the brain.

Further, the artificial neural network may be trained by adjusting weights of connections between nodes (if necessary, adjusting bias values as well) so as to produce a desired output from a given input. Also, the artificial neural network can continuously update the weight values through learning. Furthermore, methods such as back propagation may be used in training the artificial neural network.

As described above, the control unit 170 may be provided with an artificial neural network and perform machine learning-based user recognition and user's voice recognition using received audio signals as input data.

The control unit 170 may include an artificial neural network, for example, a deep neural network (DNN) and train the DNN, and examples of the DNN include CNN, RNN, DBN, and so forth. As a machine learning method for such an artificial neural network, both unsupervised learning and supervised learning may be used. The control unit 170 may control to have a tone recognition artificial neural network structure to be updated after learning according to setting.

Figure 4:
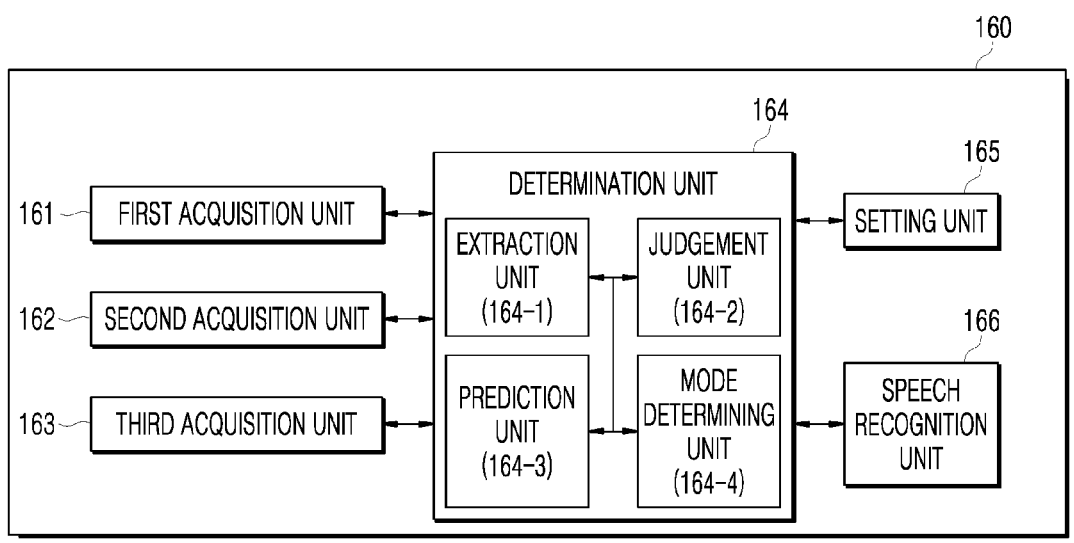
FIG. 4 is a diagram schematically illustrating a detailed configuration of an operating mode management unit of the operating mode determining device of FIG. 2.

FIG. 4 is a diagram schematically illustrating a detailed configuration of an operating mode management unit of the operating mode determining device of FIG. 2. In the following description, the common parts previously described with reference to FIG. 1 and FIG. 3 will not be described, so as to avoid repetitive description. Referring to FIG. 4, the operating mode management unit 160 may include a first acquisition unit 161, a second acquisition unit 162, a third acquisition unit 163, a determination unit 164, a setting unit 165, and a speech recognition unit 166. In some implementations, the operating mode management unit 160 may include one or more processors. In some implementations, the units 161-166 may correspond to the one or more processors. In some implementations, the units 161-166 may correspond to software components configured to be executed by the one or more processors.

The first acquisition unit 161 may acquire first image information that is obtained by photographing clothing through the camera 210 of the clothing treatment apparatus 200. Here, the first image information is generated by photographing the user's wearing clothing that stays in front of the door of the clothing treatment apparatus 200 for a predetermined time or more or may be generated by photographing clothing displayed in the clothing treatment apparatus 200. In addition, the first image information may further include not only an image of the clothing but also a care label image obligatorily attached to the clothing and photographed time information of the clothing image.

The second acquisition unit 162 may acquire second image information obtained by photographing the entrance and exit of the user wearing clothing through the home monitoring camera 300. Here, the second image information may further include a going out time and a returning time of the user wearing the clothing. Here, the going out time of the user who wears the clothing may include a time when the user disappears from the room by tracking the user who stays at the front of the door of the clothing treatment apparatus 200 for a predetermined time, and the returning time of the user who wears the clothing may include a time when the user appears in the room by the photograph of the home monitoring camera 300 after the going out time.

The third acquisition unit 163 may acquire location information between the going out time and the returning time, that is, the global positioning system (GPS) information, from the user terminal 400. Later, the determination unit 164 may determine whether the user is outdoors or indoors with clothing by using the location information between the going out time and returning time obtained from the user terminal 400, and predict the state of clothing using the location information and the weather information.

The determination unit 164 may determine an operating mode of the clothing treatment apparatus 200 according to the analysis result of the first image information and the second image information. Further, the determination unit 164 may determine an operating mode of the clothing treatment apparatus 200 and determine a washing mode of the laundry apparatus 500 linked to the clothing treatment apparatus 200 by using the first image information, the second image information, the location information of the user, and the weather information.

In the present embodiment, the determination unit 164 may include an extraction unit 164-1, a judgement unit 164-2, a prediction unit 164-3, and a mode determining unit 164-4.

Figure 6:
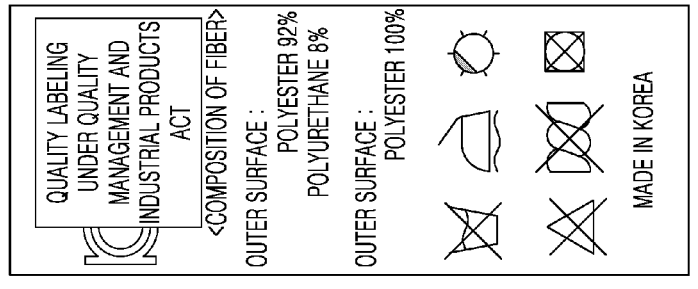
FIG. 6 is an exemplary diagram illustrating management guide information according to a type of clothing material extracted from clothing image information by the operating mode determining device of FIG. 1.
Figure 6:
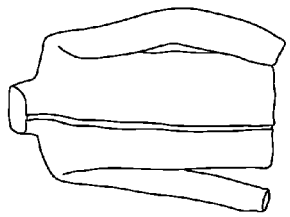
Figure 6:
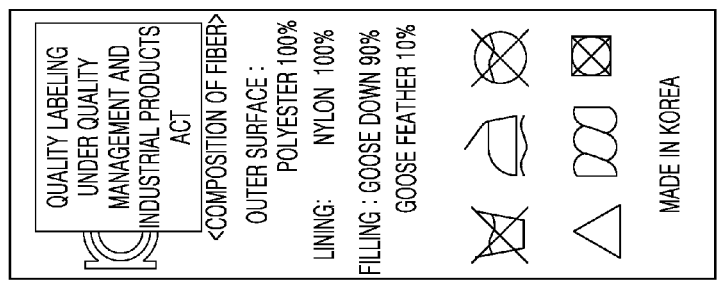
Figure 6:
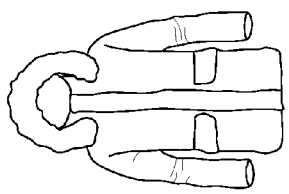
Figure 6:
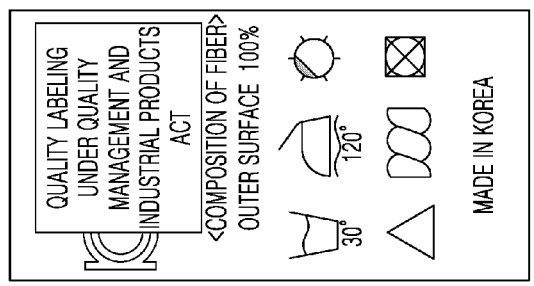
Figure 6:
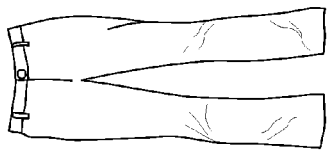

The extraction unit 164-1 may determine the type of clothing material from the first image information acquired from the first acquisition unit 161, and extract management guide information of the clothing based on the database 140 in which the management guide according to the type of clothing material is stored in advance. Here, the management guide information of clothing may include an analysis result of the clothing material and the washing symbol included in the care label included in the first image information. For example, the care label of the pants shown in FIG. 6 shows clothing material as 100% cotton, and six washing symbols are shown. Each includes hand washing, ironing at 80 to 120 degrees, and lying down and drying in the shade. Currently, the washing symbol is obligatorily attached to all clothing, and the symbol and interpretation thereof are unified. In addition, the database 140 stores the management guide of clothing according to the clothing material and the management guide of clothing according to the washing symbol in advance. If the care label is exposed facing the camera attached inside while a user displays clothing in the clothing treatment apparatus 200, the extraction unit 164-1 may extract the material and the washing symbol from the care label included in the first image information obtained by photographing through the camera through text recognition or image recognition, and extract the management guide information of the clothing by comparing it with the database 140.

The prediction unit 164-3 may predict the state of the clothing by extracting weather information between the going out time and the returning time included in the second image information obtained from the second acquisition unit 162. The prediction unit 164-3 may receive weather information between a going out time and a returning time by requesting a weather information providing apparatus (not shown) that provides weather information. For example, the weather information may include the location information of the user, that is, one or more of the temperature, humidity, fine dust level, and snow/rain amount of the area according to the location information of the user terminal 400, and the prediction unit 164-3 may predict the state of clothing by using a second deep neural network that is pre-trained to predict environmental conditions including one or more of temperature, humidity, fine dust, or snow/rain amount, and the state of clothing that changes with the time when clothing is exposed to the corresponding environment.

The mode determining unit 164-4 may determine the operating mode of the clothing treatment apparatus 200 by combining the management guide information of the clothing and the predicted state of the clothing. For example, if the clothing worn by the user is exposed to fine dust above a predetermined value, the mode determining unit 164-4 may add the fine dust course when determining the operating mode of the clothing treatment apparatus 200. In addition, if the clothing worn by the user is exposed to humidity above a predetermined value, the mode determining unit 164-4 may add the dehumidification course when determining the operating mode of the clothing treatment apparatus 200. If it is impossible to output management guide information of the clothing or the clothing material cannot be processed in the clothing treatment apparatus 200, the mode determining unit 164-4 may output that clothing cannot be processed in the clothing treatment apparatus 200.

In addition, the judgement unit 164-2 may determine the clothing material from the first image information by using a first deep neural network that is pre-trained to determine the clothing material from the clothing image.

The extraction unit 164-1 may extract management guide information of clothing based on the database 140 in which the management guide according to the type of clothing material determined by the judgement unit 164-2 is stored in advance. Here, the database 140 stores management guide information of clothing according to clothing material, for example, management guide information of clothing in which if the clothing material is acrylic, based on the properties of acrylic, which is water vulnerable, if putting the clothing into a washing machine or squeezing the clothing with force, since this may damage the clothing, it is possible to dissolve neutral detergent in warm water below 50 degrees, wash lightly, and put it in dehydrator for dehydration, and since the clothing is resistant to heat, it is possible refresh the clothing by putting it in the clothing treatment apparatus 200. Furthermore, the data base 140 may include management guide information of clothing, in which if the clothing material is poly, since it is weak to heat, it is possible to wash the clothing with warm water below 30 degrees using neutral detergent and dry the clothing in shade to prevent discoloration or shrinkage, and since heat drying should be avoided to prevent shrinkage, heat drying should be avoided when operating the clothing treatment apparatus 200.

The prediction unit 164-3 may predict the state of the clothing by extracting weather information between the going out time and the returning time included in the second image information. The mode determining unit 164-4 may determine the operating mode of the clothing treatment apparatus by combining the clothing material information, the management guide information of the clothing, and the predicted state of the clothing. If it is impossible to output management guide information of the clothing or the clothing material cannot be processed in the clothing treatment apparatus 200, the mode determining unit 164-4 may output that clothing cannot be processed in the clothing treatment apparatus 200.

As an alternative embodiment, the judgement unit 164-2 may determine the type of clothing material from the first image information and/or the care label included in the first image information. The extraction unit 164-1 may extract management guide information of clothing based on the database 140 in which the management guide according to the type of clothing material determined by the judgement unit 164-2 is stored in advance. The prediction unit 164-3 may predict the state of clothing by using weather information of an area according to location information between the going out time and the returning time included in the second image information, and the determination result on whether the user is outdoors or indoors wearing clothing. The mode determining unit 164-4 may determine the operating mode of the clothing treatment apparatus by combining the management guide information of the clothing and the predicted state of the clothing. If it is impossible to output management guide information of the clothing or the clothing material cannot be processed in the clothing treatment apparatus 200, the mode determining unit 164-4 may output that clothing cannot be processed in the clothing treatment apparatus 200.

The setting unit 165 may be linked with the clothing treatment apparatus 200 through the network 700 in response to an analysis result of the first image information and the second image information, and may set a laundry mode of the laundry apparatus 500 for washing clothing. Here, the fact that the laundry apparatus 500 is interlocked with the clothing treatment apparatus 200 may include that it is possible to communicate with each other over the same network 700 and since the clothing treatment apparatus 200 stores the control code of the laundry apparatus 500, it is possible to control the operation of the laundry apparatus 500.

When clothing is not treated cleanly even if the clothing is processed by the clothing treatment apparatus 200, the setting unit 165 may set the laundry mode of the laundry apparatus 500, and recommend the user to use the laundry apparatus 500. Since the setting unit 165 automatically sets the laundry mode of the laundry apparatus 500, only if the user simply inserts clothing into the laundry apparatus 500, the laundry apparatus 500 automatically performs washing and drying so that the user's convenience can be improved.

The speech recognition unit 166 may recognize the operating mode determination request utterance speech of the clothing treatment apparatus 200 and/or the laundry apparatus 500 received from the user, and determine the utterance intention of the user's operating mode determination request utterance speech. In this embodiment, the speech recognition unit 166 may include an auto speech recognition unit (ASR) (not shown), a natural language understanding unit (not shown), and a natural language generation unit (not shown) and a text to speech (TTS) unit (not shown).

The auto speech recognition unit may generate an operating mode determination request text obtained by converting an operating mode determination request utterance speech from a user received through the audio input unit 131 into text. In the present embodiment, the auto speech recognition unit may perform speech to text (STT). The auto speech recognition unit may convert the received user's operating mode determination request utterance speech into an operating mode determination request text. In the present embodiment, the auto speech recognition unit may include a utterance recognition unit (not shown). The utterance recognition unit may include an acoustic model and a language model. For example, the acoustic model may include vocalization-related information, and the language model may include unit phoneme information and information about a combination of the unit phoneme information. The utterance recognition unit may convert the user's operating mode determination request utterance speech into an operating mode determination request text by using information related to utterance and unit phoneme information. Information about the acoustic model and language model may be stored, for example, an auto speech recognition database (not shown) in the auto speech recognition unit.

The natural language understanding unit performs syntactic analysis or semantic analysis on the operating mode determination request text so that it is possible to analyze the utterance intention of the user's operating mode determination request utterance speech. Here, the syntactic analysis may divide a query text into syntactic units (e.g., words, phrases, morphemes, etc.), and may recognize syntactic elements that the divided units have. In addition, the semantic analysis can be performed using semantic matching, rule matching, formula matching, and the like. Accordingly, the natural language understanding unit can obtain what intent the clothing coordination request text is or a parameter necessary to express the intention.

The natural language generation unit may generate an operating mode determination response text for the operating mode determination request text using a knowledge base on the basis of the utterance intention analyzed by the natural language understanding unit.

The text to speech unit may generate an operating mode determination response utterance speech as a response utterance speech conversion result for the operating mode determination response text in the natural language utterance form, which is generated by the natural language generation unit, and output the operating mode determination response utterance speech through the audio output unit 132.

Figure 5:
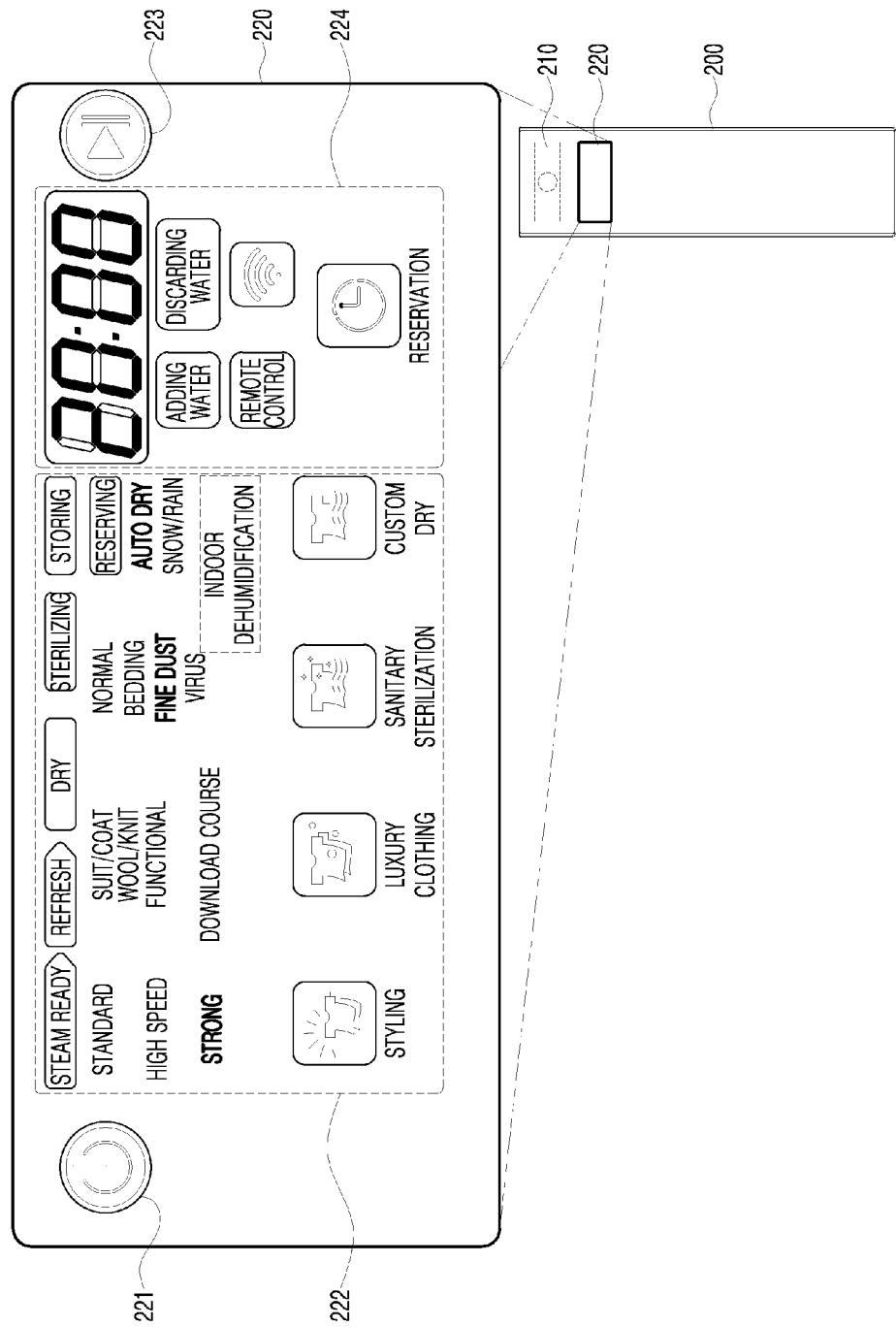
FIG. 5 is an exemplary view illustrating an operating mode control panel displayed on a clothing treatment apparatus of the operating mode determining environment of FIG. 1.

FIG. 5 is an exemplary view illustrating an operating mode control panel displayed on a clothing treatment apparatus of the operating mode determining environment of FIG. 1. Hereinafter, a description of the common parts previously described with reference to FIGS. 1 to 4 will be omitted.

Referring to FIG. 5, the operating mode control panel 220 of the clothing treatment apparatus 200 may include a power supply setting unit 221 for setting the power on/off, a course setting unit 222 for selecting various courses, an execute/stop selection unit 223 for selecting an operation of execute/stop according to a selected course, and a status display unit 224 for displaying the operating state of the clothing treatment apparatus 100. In this embodiment, the operating mode control panel 220 of the clothing treatment apparatus 200 may be automatically set and operated in response to an operating mode determined by the operating mode determining device 100 according to an analysis result of the first image information and the second image information. Furthermore, the operating mode control panel 220 of the clothing treatment apparatus 200 may be automatically set and operated in response to an operating mode determined by the operating mode determining device 100 according to the first image information, the second image information, the location information of the user, and the weather information.

In FIG. 5, the operating mode determining device 100 displays an operating mode including strong steam, fine dust and automatic drying set on the operating mode control panel 220 according to the analysis result of the first image information and the second image information, and the clothing treatment apparatus 200 may perform an operation according to the determined operating mode.

FIG. 6 is an exemplary diagram illustrating management guide information according to a type of clothing material extracted from clothing image information by the operating mode determining device of FIG. 1. Hereinafter, a description of the common parts previously described with reference to FIGS. 1 to 5 will be omitted.

Referring to FIG. 6, when a user displays clothing on the clothing treatment apparatus 200, by exposing the care label to face the camera attached inside, this shows first image information generated by the camera photographing clothing, a care label extracted from the first image information, and a recognition result of the care label, that is, the clothing material and the washing symbol.

The care label of the pants shown in FIG. 6 shows clothing material as 100% cotton, and six washing symbols are shown. Each symbol includes hand washing, ironing at 80 to 120 degrees, and lying down and drying in the shade. Currently, the washing symbol is obligatorily attached to all clothing, and the symbol and interpretation thereof are unified. Thus, the operating mode determining device 100 may extract the material and washing symbol through character recognition or image recognition as a result of care label recognition, and extract management guide information of clothing by comparing this with the management guide of clothing according to the clothing material stored in the database and the management guide of clothing according to the washing symbol.

Figure 7:
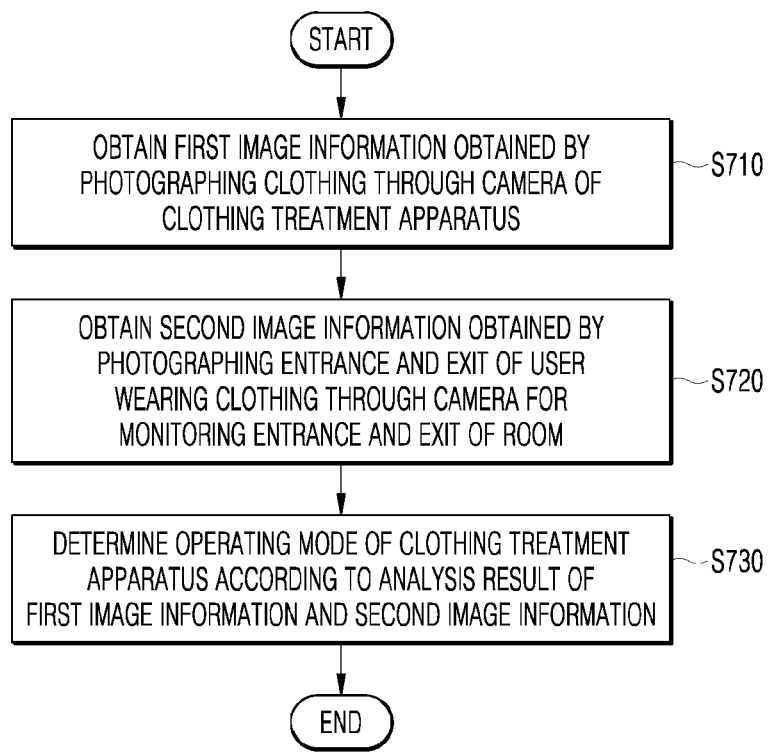
FIG. 7 is a flowchart illustrating an operating mode determining method according to an embodiment of the present disclosure.

FIG. 7 is a flowchart illustrating an operating mode determining method according to an embodiment of the present disclosure. In the following description, a description of the common parts previously described with reference to FIG. 1 and FIG. 6 will be omitted.

Referring to FIG. 7, in operation S710, the operating mode determining device 100 obtains first image information obtained by photographing clothing through the camera 210 of the clothing treatment apparatus 200. Here, the first image information is generated by photographing the user's wearing clothing that stays in front of the door of the clothing treatment apparatus 200 for a predetermined time or more or may be generated by photographing clothing displayed in the clothing treatment apparatus 200. In addition, the first image information may further include not only an image of the clothing but also a care label image obligatorily attached to the clothing and photographed time information of the clothing image.

In operation S720, the operating mode determining device 100 obtains second image information obtained by photographing the entrance and exit of the user wearing clothing through the home monitoring camera 300. Here, the second image information may further include a going out time and a returning time of the user wearing the clothing. Here, the going out time of the user who wears the clothing may include a time when the user disappears from the room by tracking the user who stays at the front of the door of the clothing treatment apparatus 200 for a predetermined time, and the returning time of the user who wears the clothing may include a time when the user appears in the room by the photograph of the home monitoring camera 300 after the going out time.

In operation S730, the operating mode determining unit 100 may determine an operating mode of the clothing treatment apparatus 200 according to the analysis result of the first image information and the second image information.

As an alternative embodiment, the operating mode determining device 100 may obtain location information between a going out time and a returning time, that is, global positioning system (GPS) information, from the user terminal 400.

As an alternative embodiment, the operating mode determining device 100 may determine the type of clothing material from the first image information, and extract management guide information of the clothing based on the database in which the management guide according to the type of clothing material is stored in advance. In addition, the database stores the management guide of clothing according to the clothing material and the management guide of clothing according to the washing symbol in advance. If the care label is exposed facing the camera attached inside while a user displays clothing in the clothing treatment apparatus 200, the material and the washing symbol may be extracted from the care label included in the first image information obtained by photographing via the camera through text recognition or image recognition, and the management guide information of the clothing may be extracted by comparing it with the database 140. The operating mode determining device 100 may predict the state of the clothing by extracting weather information between the going out time and the returning time included in the second image information. The operating mode determining device 100 may receive a weather information between a going out time and a returning time by requesting a weather information providing apparatus (not shown) that provides weather information through the network 700. The operating mode determining device 100 may predict the state of clothing by using environmental conditions including one or more of temperature, humidity, fine dust, and snow/rain amount and a second deep neural network that is pre-trained to predict the condition of clothing that changes with time when clothing is exposed to the corresponding environment. The operating mode determining device 100 may determine the operating mode of the clothing treatment apparatus by combining the management guide information of the clothing and the predicted state of the clothing.

As an alternative embodiment, the operating mode determining device 100 may determine the clothing material from the first image information by using a first deep neural network that is pre-trained to determine the clothing material from the clothing image. The operating mode determining device 100 may extract management guide information of clothing based on a database in which a management guide according to the type of clothing material is stored in advance. Here, the management guide information of clothing according to the clothing material is stored in the database. The operating mode determining device 100 may predict the state of the clothing by extracting weather information between the going out time and the returning time included in the second image information. The operating mode determining device 100 may determine the operating mode of the clothing treatment apparatus by combining the clothing material information, the management guide information of the clothing, and the predicted state of the clothing.

As an alternative embodiment, the operating mode determining device 100 may determine the type of clothing material from the first image information, extract management guide information according to the type of clothing material, extract weather information of the area according to the location information between the going out time and the returning time included in the second image information to predict the state of clothing, and determine the operating mode of the clothing treatment apparatus by combining the management guide information of the clothing and the predicted state of the clothing.

As an alternative embodiment, the operating mode determining device 100 may be linked with the clothing treatment apparatus 200 through the network 700 in response to an analysis result of the first image information and the second image information, and may set a laundry mode of the laundry apparatus 500 for washing clothing.

According to an embodiment of the present disclosure, by automatically setting and operating the operating mode of the clothing treatment apparatus based on the clothing photographing image information, the user's satisfaction with the clothing treatment apparatus can be improved.

Also, by varying the operating mode and operating time of the clothing treatment apparatus based on time and weather information when the user is wearing clothing, the user's satisfaction with the clothing treatment apparatus can be improved.

Also, by varying the operating mode and operating time of the clothing treatment apparatus based on time and weather information when the user is wearing clothing, energy can be saved.

In addition, by automatically setting and operating the operating mode of the laundry apparatus and the clothes dryer interlinked through the clothing treatment apparatus and the network, the convenience of the user can be improved.

In addition, although the clothing treatment apparatus is a mass-produced uniform product, the user may recognize the clothing treatment apparatus as a personalized device, and thus experience the effect of a user-specific product.

In addition, by automatically setting and operating the operating mode of the clothing treatment apparatus according to the clothing image information using only optimal processor resources, the power efficiency of the clothing treatment apparatus can be improved.

Embodiments according to the present disclosure described above may be implemented in the form of a computer program that can be executed through various components on a computer, and such a computer program may be recorded on a computer readable medium. At this time, the medium may include a hardware device specifically configured to store and execute program instructions, for example, magnetic media such as hard disks, floppy disks, and magnetic tape, optical recording media such as CD-ROMs and DVDs, magneto-optical media such as floptical disks, and ROM, RAM, flash memory, and the like.

On the other hand, the computer program may be specially designed and configured for the present disclosure, or may be known and available to those skilled in the computer software field. Examples of program code include both machine codes, such as produced by a compiler, and higher level code that may be executed by the computer using an interpreter.

In the specification (particularly in the claims) of the present disclosure, the use of the term "above" and the like indicating term may be used in the singular and the plural. In addition, when ranges are described in this invention, inventions applied with individual values within the above ranges (if not stated otherwise) are included, and the individual values constituting the range are the same as those in the detailed description of the invention.

Operations constituting the method of the present disclosure may be performed in appropriate order unless explicitly described in terms of order or described to the contrary. The present disclosure is not necessarily limited to the order of operations given in the description. All examples described herein or the terms indicative thereof ("for example," etc.) used herein are merely to describe the present disclosure in greater detail. Therefore, it should be understood that the scope of the present disclosure is not limited to the example embodiments described above or by the use of such terms unless limited by the appended claims. Therefore, it should be understood that the scope of the present disclosure is not limited to the example embodiments described above or by the use of such terms unless limited by the appended claims. Also, it should be apparent to those skilled in the art that various alterations, substitutions, and modifications may be made within the scope of the appended claims or equivalents thereof.

Therefore, technical ideas of the present disclosure are not limited to the above-mentioned embodiments, and it is intended that not only the appended claims, but also all changes equivalent to claims, should be considered to fall within the scope of the present disclosure.

What is claimed is:

1. A method of controlling an operation of a clothing treatment apparatus installed indoors, the method comprising:

obtaining first image information obtained by photographing clothing through a camera of the clothing treatment apparatus;

obtaining second image information obtained by photographing an entrance and exit of a user wearing the clothing through a camera for monitoring an entrance and exit of a room of a home; and determining an operating mode of the clothing treatment apparatus according to an analysis result of both the first image information of the clothing in the clothing treatment apparatus and the second image information of the user wearing the clothing outside of the clothing treatment apparatus when the user enters and exits the home while wearing the clothing, wherein the first image information and the second image information are obtained from images of identical clothing by different cameras at different times, and wherein the determining of the operating mode comprises:

determining a clothing material from the first image information by using a first deep neural network that is pre-trained to determine a clothing material from a clothing image;

extracting management guide information of the clothing based on a database in which a management guide according to a clothing material type is stored in advance;

predicting a state of the clothing by extracting weather information between a going out time and a returning time of the user wearing the clothing outside of the home that are included in the second image information; and determining the operating mode of the clothing treatment apparatus by combining the determined clothing material, the management guide information of the clothing, and the predicted state of the clothing.

2. The method of claim 1, wherein the obtaining of the second image information comprises obtaining the second image information including a total wearing time between the going out time and the returning time of the user wearing the clothing outside of the home.

3. The method of claim 2, further comprising, after the obtaining of the second image information and before the determining of the operating mode, obtaining location information for a location of the user wearing the clothing outside of the home between the going out time and the returning time from a terminal of the user.

4. The method of claim 3, wherein the determining of the operating mode further comprises:

predicting the state of the clothing by extracting weather information of an area according to the location information between the going out time and the returning time included in the second image information.

5. The method of claim 4, wherein the weather information comprises one or more of temperature, humidity, or fine dust degree of an area according to the location information, wherein the predicting of the state of the clothing comprises predicting the state of the clothing using a second deep neural network that is pre-trained to predict a state of clothing that changes according to an environmental condition including one or more of temperature, humidity, or fine dust degree and a time when clothing is exposed to a corresponding environment.

6. The method of claim 1, further comprising, in response to an analysis result of the first image information and the second image information, interworking with the clothing treatment apparatus and setting a washing mode of a laundry apparatus to wash the clothing.

7. A computer-readable recording medium storing a computer program for executing the method of claim 1 using a computer.

8. A device for controlling an operation of a clothing treatment apparatus installed indoors, the device comprising:

one or more processors; and
a memory coupled to the one or more processors,
wherein the one or more processors are configured to:
obtain first image information obtained by photographing clothing through a camera of the clothing treatment apparatus;
obtain second image information obtained by photographing an entrance and exit of a user wearing the clothing through a camera for monitoring an entrance and exit of a room of a home;
determine an operating mode of the clothing treatment apparatus according to an analysis result of both the first image information of the clothing in the clothing treatment apparatus and the second image information of the user wearing the clothing outside of the clothing treatment apparatus when the user enters and exits the home while wearing the clothing,
wherein the first image information and the second image information are obtained from images of identical clothing by different cameras at different times;
determine a clothing material from the first image information by using a first deep neural network that is pre-trained to determine a clothing material from a clothing image;
extract management guide information of the clothing based on a database in which a management guide according to a clothing material type is stored in advance;
predict a state of the clothing by extracting weather information between a going out time and a returning time of the user wearing the clothing outside of the home that are included in the second image information; and
determine the operating mode of the clothing treatment apparatus by combining the determined clothing material, the management guide information of the clothing, and the predicted state of the clothing.

9. The device of claim 8, wherein the one or more processors are configured to obtain the second image information including total wearing time between the going out time and the returning time of the user wearing the clothing outside of the home.

10. The device of claim 9, wherein the one or more processors are further configured to obtain location information for a location of the user wearing the clothing outside of the home between the going out time and the returning time from a terminal of the user after the obtaining of the second image information and before the determining of the operating mode.

11. The device of claim 10, wherein the one or more processors are further configured to:

predict the state of the clothing by extracting weather information of an area according to the location information between the going out time and the returning time included in the second image information.

12. The device of claim 11, wherein the weather information comprises one or more of temperature, humidity, or fine dust degree of an area according to the location information, wherein the one or more processors are configured to predict a state of the clothing using a second deep neural network that is pre-trained to predict a state of clothing that changes according to an environmental condition including one or more of temperature, humidity, or fine dust degree and a time when clothing is exposed to a corresponding environment.

13. The device of claim 8, wherein the one or more processors are further configured to interwork with the clothing treatment apparatus and set a washing mode of a laundry apparatus to wash the clothing in response to an analysis result of the first image information and the second image information.

* * * * *